No. 782,739.  
Patented February 14, 1905

UNITED STATES PATENT OFFICE.

EMIL FISCHER, OF BERLIN, GERMANY, ASSIGNOR TO THE FIRM OF E. MERCK, OF DARMSTADT, GERMANY, A COPARTNERSHIP.

C-C-DIALKYL-BARBITURIC ACID AND PROCESS OF MAKING SAME.

SPECIFICATION forming part of Letters Patent No. 782,739, dated February 14, 1905.

Application filed January 22, 1903. Serial No. 140,108. (Specimens.)

*To all whom it may concern:*

Be it known that I, EMIL FISCHER, a subject of the Emperor of Germany, and a resident of Berlin, Germany, have invented a new Pharmaceutical Product and a Process Whereby it Can be Made; and I hereby declare the following to be a specification thereof.

The present application covers specifically the new hypnotic diethyl barbituric substance, which in its acid form has the melting-point 191° centigrade, and a process by which it can be made. According to my researches this new substance may be obtained by condensing diethyl-malonic acid-ester with urea in the presence of sodium alcoholate. I term the dialkyl derivatives of barbituric acid described hereinafter "C-C-dialkyl-barbituric" acids, meaning thereby that the acid radical contained in the particular acid has two alkyl radicals, both attached to one carbon atom in substitution for two hydrogen atoms in the $CH_2$ group.

I prefer to make said new substance as follows: Thirty-two parts, by weight, of sodium are dissolved in six hundred parts, by weight, of absolute alcohol. On cooling, one hundred parts, by weight, of diethyl-malonic acid-ethyl ester are added, and in this mixture forty parts, by weight, of finely-powdered simple urea are dissolved with the aid of heat. The heating is continued at 100° to 110° centigrade for about four to five hours, the operation being most advantageously carried out in an autoclave. By this means the sodium salt of diethyl barbituric acid mixed with a little sodium carbonate is precipitated as a colorless partly-crystalline mass. On complete cooling this is filtered. The alcoholic mother-lye on being again heated to the same temperature yields an additional quantity of the same product. The total of the sodium salts is dissolved in water and then decomposed by hydrochloric acid. Recrystallizing the immediately-precipitated C-C-diethyl-barbituric acid from hot water suffices for obtaining a good yield of a pure preparation. The compound has the composition $C_8H_{12}O_3N_2$. It crystallizes from warm water in large, colorless, lanceolate, or acicular crystals. It dissolves in about one hundred and fifty parts of water of 20° centigrade and is much more freely soluble in water at 100° centigrade and is also soluble in sodium-hydrate and potassium-hydrate solutions. It melts at 191° centigrade, (corrected.)

Although I have above described an example by which my new diethyl-barbituric acid may be obtained, I do not wish to be understood as limiting my product-claim to any process, nor do I wish to be understood as excluding from my process-claim equivalents for the ingredients, the apparatus, or the operations employed in the process. It is probable that substitutes may be employed without departing from the scope of the process intended to be secured hereby. For example, acetylurea may be employed instead of urea in the described process without changing the resultant product, as the acetyl group is split off in the reaction, or instead of sodium alcoholate other alcoholates, such as potassium alcoholate, may be used.

My new diethyl barbituric acid possesses the property of forming salts with many metals—for example, the alkali metals, the hydrogen of the NH group being replaced by the metal. Therefore the substance which is the subject of this application may be either in the acid or salt form. In fact, when introduced into the system in its salt form it is decomposed by the weak acids of the system into its acid form.

My new product is characterized by the melting-point of 191° centigrade, (corrected.) It possesses most remarkable medicinal merits. An average dose of one-half gram of it taken internally will produce natural sleep, while the substance ordinarily passes the system, and the greatest part of the administered quantity can be recovered from the urine after two or three days. Since it neither contains nor is decomposed into deleterious substances, it may be used as a hypnotic without substantial harm to the patient.

Other dialkyl barbituric substances are the subject of other applications filed by me, Serial No. 220,967, filed August 16, 1904; Serial No. 220,968, filed August 16, 1904; Serial No. 220,969, filed August 16, 1904.

Having now described my invention and in what manner the same is to be performed, what I claim as new, and desire to secure by Letters Patent, is—

1. The herein-described new hypnotic diethyl barbituric substance which in the acid form melts at 191° centigrade, when recrystallized from water, and is soluble in solutions of sodium hydrate and potassium hydrate, and in the salt form of which the metal replaces the hydrogen of the NH group.

2. The herein-described new process of making the new hypnotic diethyl barbituric acid, consisting in condensing diethyl-malonic acid-ester with urea in the presence of a metal alcoholate, separating the thus-produced sodium salt of diethyl barbituric acid by filtration and converting the sodium salt into the free diethyl barbituric acid by the addition of acid.

Signed at Berlin this 2d day of January, 1903.

EMIL FISCHER.

Witnesses:
  WOLDEMAR HAUPT,
  HENRY HASPER.